Sept. 13, 1966 K. WEINHOLD 3,272,536
QUICK COUPLING DEVICE FOR HOSES

Filed Nov. 12, 1964 2 Sheets-Sheet 1

INVENTOR
KARL WEINHOLD

BY Toulmin & Toulmin
ATTORNEYS

Sept. 13, 1966        K. WEINHOLD        3,272,536
QUICK COUPLING DEVICE FOR HOSES
Filed Nov. 12, 1964        2 Sheets-Sheet 2
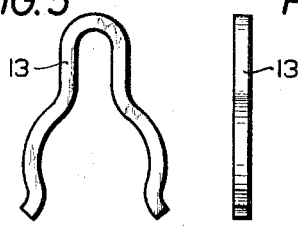
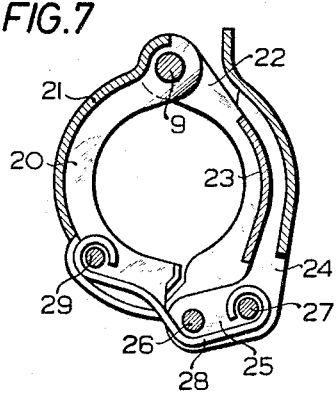
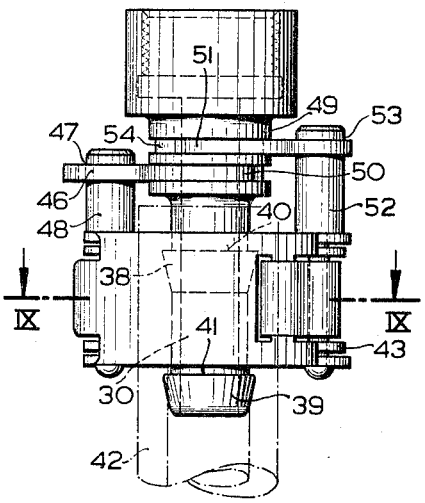
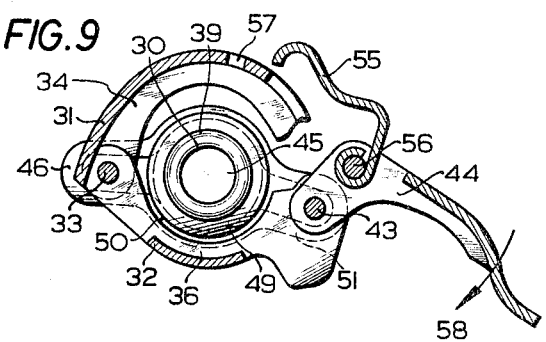
INVENTOR
KARL WEINHOLD
BY Toulmin & Toulmin
ATTORNEYS 3,272,536
QUICK COUPLING DEVICE FOR HOSES
Karl Weinhold, 8 Kreitzweg, Holzheim, near
Neuss, Germany
Filed Nov. 12, 1964, Ser. No. 410,405
9 Claims. (Cl. 285—114)

This invention relates to coupling devices, and particularly to quickly detachable coupling means for joining together the free ends of tubular conduits or hoses of flexible material.

Such coupling devices are mounted on one or both ends of a tubular conduit section or hose or on any fittings provided with a connecting means for such conduits or hoses.

Several types of coupling devices for the aforesaid purposes are known. A particularly advantageous embodiment of such coupling device has been described in my U.S. Patent 2,725,246, issued November 29, 1955, which embodiment has been used in practice for the connection of hoses which are subjected to high internal pressures. This known embodiment comprises two sleeve halves ending on their semi-circular edges in jaw-shaped flanges, which sleeve halves are joined together articulatedly along one longitudinal edge thereof by means of a pivot bolt, about which the two sleeve halves can be swivelled apart or clamped together. In the latter state, the jaw-shaped flanges can grip firmly and tightly the end or ends of a flexible hose to which the coupling device is to be attached. As a counter element a rigid tube-shaped body or section is usually inserted into the open end or ends of the flexible conduit or hose. Gripping and sealing of the hose end between the inserted tubular section and the jaw-shaped portions of the coupling device is effected by pulling the two sleeve halves together to surround the hose entirely, by means of a spring-loaded toggle lever. In the above-mentioned U.S. Patent 2,725,246, the coupling device is also referred to as a "double clamp" because each of the two sleeve halves described hereinbefore presses with its two jaw-like flange rims upon the outer wall of the hose. This known coupling device may therefore serve for the simultaneous clamping together of two different hose ends which have both been drawn onto an inserted section connecting them; or this double clamp-type coupling device may be used for gripping one and the same hose end with both jaw-shaped flange rims. In this case the coupling device is applied near the end of the hose. In this case, the afore-mentioned tubular connecting section has been inserted into the hose end to extend through the entire length of the hose zone to the outside of which the coupling device is to be applied.

In the same manner two hose ends can be connected together by inserting into the interior of each hose end one of the two ends of the above-mentioned rigid intermediate tubular connecting section and to apply two coupling-devices, one to each hose end, about the hose zone through the interior of which the said connecting section extends, thus establishing a firm, hermetically sealed connection between the two hose ends. Nevertheless, each hose end can be rapidly detached and removed from the intermediate connecting piece by opening the respective double clamp-type coupling device by means of its toggle lever.

Coupling devices of this "double clamp" type cannot only be mounted on the usual rubber hoses but also on hoses of plastic synthetic resin and the like resilient materials. They can be applied to flexible conduits and hoses for conveying gaseous media, such as compressed air, and equally well to hydraulic conduits and hoses, e.g. in water-conduits subject to high pressure.

It is particularly advantageous for the sealing effect of a coupling device of this type when the intermediate tubular section is provided, near the end which is to be inserted into the hose, with two or more successively disposed beads or the like projections, e.g. by conically tapering the diameter of the section so as to increase in the direction from the end toward the middle of the tubular section, the diameter of the section being abruptly reduced behind the bead. The double clamp-type coupling device is then preferably mounted on the hose in such a manner that its flange rim engages the hose in a zone immediately behind the bead, e.g. where the diameter of the section is abruptly reduced, whereby the hose is clamped between the bead of the section and the rim of the flange and a particularly hermetical sealing effect is achieved.

However, the proper locating of the coupling device relative to the beads of the intermediate tubular section has proved to be uncertain and time consuming especially where the hose material is not transparent and where two double clamps are to be used. There is always a certain danger that the double clamp coupling device may not be positioned exactly in the desired position relative to the bead or beads on the intermediate section, so that there is danger of an axial displacement of the coupling device relative to the intermediate section which may lead to a deterioration of the sealing effect and in extreme cases the hose may work loose from the intermediate section. In order to counteract this danger, it may be considered necessary to keep the portion of section inserted into the hose unduly long. Indeed, the shorter the portion of the section that must be inserted, the more rapid and easier will be the mounting of the hose end thereon.

It is therefore an object of this invention to provide an improved double clamp type coupling device which permits mounting on and removing from one and the same hose end in the easiest manner and shortest time possible while being at the same time secure against axial displacement relative to the inserted intermediate section without, however, impairing the freedom of the sleeve halves to be opened and closed, and to enable automatically an exact positioning of the coupling device relative to the beads of the intermediate tubular section.

It is another object of the invention to provide a coupling device of the type and advantages described in the foregoing, the construction of which requires a minimum of machining and surface treatment.

It is furthermore an important object of the invention to provide an assembly of a double clamp-type coupling device with an insertable tubular section which is capable of taking up evenly the tensile stresses and bending or shearing forces occurring in the interior of the clamped-in hose at the occurrence of high pressure, thereby avoiding the formation of detrimental forces that might deform the double clamp and in particular the pivot bolt thereof, and might thus diminish the sealing effect and loosen the grip of the coupling device on the hose.

These objects are obtained by the improved construction of a double clamp-type coupling device according to the invention, which comprises the two sleeve halves connected with each other by a pivot bolt, a toggle lever mechanism for opening and closing the sleeve halves which are devised as described in my U.S. Patent 2,725,-246, supra, an insertable tubular section at least one end of which is adapted for insertion into a hose and which section is provided on its outer wall near the insertable end thereof with at least one or preferably two beads or the like projections, preferably conically shaped to project abruptly on the bead side facing away from the insertable end, and being gradually, preferably conically, tapered on the bead side toward the insertable end of the tubular section, and further comprising mechanical means connecting the coupling device with the insertable tubular section in such a manner that axial displacement of the former relative to the latter is made impossible, while the opening and closing of the sleeve halves by means of the said toggle lever remains unimpaired, the said mechanical connecting means holding the coupling device in such a position relative to the insertable tubular section that the rims of the flanged portions of the sleeve halves are disposed close to, but just behind the shoulders formed by the abrupt slope of the beads, seen from the insertable ends of the tubular section toward the central portion of the latter.

The mechanical connecting means in the coupling assembly according to the invention comprises a rod or pin projecting from the double clamp coupling device in axial direction, which rod or pin is preferably an extension of the pivot bolt itself beyond the sleeve halves on the side of the coupling device facing away from the insertable end of the tubular section, which pin or rod is mounted rotatably, but not displaceable in axial direction in supporting means which are in turn mounted undisplaceably in axial direction but preferably rotatable about the tubular section, preferably in order to facilitate a rapid mounting and removing of the double clamp as well as an effective transfer of the forces acting on the hose, onto the tubular section, the aforesaid extension of the pivot bolt or the like pin or rod of the double clamp is connected to the tubular section by means of an elastic, e.g. spring-loaded, preferably hoop- or bow-shaped clamp or the like means which on the one hand engages a groove of the pivot bolt extension rod or pin and, on the other hand, a groove in the circumference of the tubular section which is exactly positioned in axial relation on the tubular section to hold the clamping device for proper cooperation of the rims of its sleeve halves with the bead or beads on the section.

In this manner, swivelling of the sleeve halves about the pivot bolt connecting them remains completely unimpaired while any axial displacement of the double clamp relative to the tubular section is effectively prevented.

Preferably, the aforesaid connecting clamp consists of spring steel and possesses multigonal, preferably rectangular or square cross section, so that it fits closely into the grooves of the aforesaid pivot bolt extension and of the tubular section wall, which grooves are of correspondingly shaped cross section.

This coupling device according to the invention in which double clamp coupling device and insertable tubular section are connected with each other axially undisplaceable and thereby always clamping the hose at one and the same distance from its end between the rim or rims of the sleeve halves of the double clamp coupling device and the abrupt shoulders of the beads of the tubular section, produces an optimal sealing effect which resists even pressures in the interior of the hose which exceed even 100 atmospheres. The connection between hose and coupling assembly resists even such pressures at which the unclamped portion of the hose is destroyed, but no separation of the hose of the inserted tubular section takes place.

It is a special advantage of the coupling assembly according to the invention that the coupling device can be positioned and fastened almost instantaneously upon the tubular section which has been inserted into a hose end, for this instantaneous positioning can be effected by simply pushing the spring clamp onto the pivot bolt extension and the wall of the tubular section by fitting it into the grooves of suitably shaped cross-section, provided in both said pivot bolt extension and said tubular section. The thus positioned coupling device is then closed and tightened on the hose in exact relationship and therefore proper co-operation with the bead or beads on the tubular section. Equally, after the double clamp means of the coupling device have been opened by corresponding actuation of the toggle lever, the connecting spring clamp can be pulled out of the grooves of pivot bolt extension and tubular section, and the mechanical connection between the coupling device proper and the tubular section can thus be instantaneously removed and the coupling device can be taken off the tubular section and the hose thereon. The two sleeve halves can be of a conventional material, e.g., steel, bronze, light metal, pressed, forged, or cast metal, or, in the case of less severe stresses also of synthetic plastic organic resin or the like material. In closed condition the two sleeve halves form a body of substantially circular cross section, whereby it is avoided that, in the case of a movement of the entire hose conduit, for instance in building or mining operations, the coupling device could get caught anywhere.

The manufacture of the double clamp coupling device and its connecting clamp to its tubular section is very simple and economical. The tubular section itself as well as the pivot bolt connecting the sleeve halves of the double clamp coupling device can be manufactured on an automatic tool, while the sleeve halves can be produced as pressed or cast pieces, e.g. on automatically controlled lathes. Also, the connecting spring clamp can be manufactured automatically, for instance by cutting pieces of suitable length from a spring steel of square or rectangular cross-section, which pieces are then beat in a cold or hot working treatment.

Thereby, any manual processing of the parts of the coupling assembly according to the invention mentioned has become superfluous. All automatically manufactured parts can be mounted immediately and can be assembled ready for use, e.g. by automatic riveting into place of the pivot bolt.

A further essentially improved embodiment of the hose coupling assembly according to the invention, which is capable of sustaining even very high pressures, e.g. up to 500 atmospheres gauge pressures, comprises a second pin or bolt, arranged at that end face of the double clamp coupling device from which the extension of the pivot bolt protrudes, which second bolt or pin is disposed on the free end of one of the two sleeve halves to be positioned approximately diametrically opposite the pivot bolt by which the two sleeve halves are hingedly connected. This second pin or bolt which protrudes from the coupling device in the same direction away from the hose end as the extension of the first-mentioned pivot bolt, is connected to the tubular section by similar means, preferably a second connecting clamp, and in a similar manner by suitable polygonal design of the connecting clamp cross section and provision of correspondingly cross sectional grooves in the second bolt or pin and in the tubular section. Thus, the second pin does neither obstruct the opening and closing of the sleeve halves nor the operation of the toggle lever while fixing the coupling device rigidly against displacement relative to the tubular section in axial direction. Advantageously, this second pin or bolt can consist of an extension of the bolt forming part of the joint between the free end of one of the sleeve halves and the toggle lever.

In this second, preferred embodiment of the invention the coupling device is fixed against axial displacement vis-a-vis the tubular section not only in one but in two approximately diametrically opposite points. This results in an even distribution of tensile stresses exerted by the hose on the coupling device, even at maximal pressures, on the aforesaid two diametrically opposite points and thereby on the two abovementioned bolts or pins. Consequently, the latter are subjected only to tensile stresses, but not to any bending or shearing forces. As a further consequence, the sealing effect of such a hose coupling with axially nondisplaceable positioning of both sleeve halves is particularly high.

Practical use has shown that coupling assemblies according to the invention guarantee a long-lasting, full sealing effect even when applied to hoses subjected to the highest gauge pressures of several hundred atmospheres, e.g. to rubber hoses with inserted layer of polyamide material.

In the accompanying drawings, several embodiments of the coupling assembly according to the invention are illustrated by way of example:

FIGURE 5 shows a connecting spring clamp in front view;

FIGURE 6 shows the same element in lateral view;

FIGURE 7 shows a cross-sectional view of the embodiment shown in FIGURE 3 taken along the plane VII—VII;

FIGURE 8 shows in lateral view a further improved embodiment of a hose coupling assembly according to the invention in locked condition; and FIGURE 9 represents a cross-sectional view of the embodiment shown in FIGURE 8 taken along the plane IX—IX therein.

Figure 1:
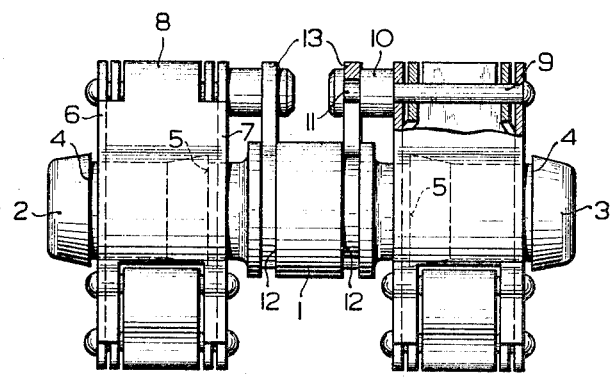
FIGURE 1 represents a side view of a double end tubular section for mounting two hose ends thereon, and two coupling devices according to the invention mounted thereon.

Referring now to the drawings in detail and more particularly to FIGURE 1, reference numeral 1 designates the central, cylindrically shaped portion of a tubular section, the end portions 2 and 3 of which can be inserted into the open ends of two pieces of hoses which are to be connected with each other. Each end portion 2, 3 is provided with two beads 4 and 5, respectively which are tapered in a known manner toward the end of the tubular section, while, toward the central portion of the said section, they form a shoulder, due to an abrupt reduction of the diameter of the adjacent portions of the tubular section. The distance of the two beads pertaining to the same end portions is so dimensioned that the flanges 6 and 7 of a double clamp-coupling device 8 grip the hose into which, e.g., the section end 2 has been inserted, closely behind the rearwardly facing shoulders of the beads 4 and 5, i.e. on the side of said beads toward the central portion 1 of the tubular section, so that the hose is clamped in tightly in two zones, one formed between bead 4 and flange rim 6 and the other between bead 5 and flange rim 7, respectively, thus firmly engaging and clamping in the hose end. In connection herewith it is of special importance that the clamping effect occurs at a determined short distance, e.g. of 1 to 3 millimeters, behind the rearward shoulders of beads 4 and 5. In order to guarantee that this distance will be maintained the double clamp coupling device 8 is connected essentially non-displaceable in axial direction with the tubular section, the ends of which have been designated by 2 and 3, whereby, in view of the fixed position of the coupling device, the clamping-in of a hose end mounted on the respective end of the tubular section, will always take place at the same distance from the beads 4, 5. The non-displaceable positioning of the coupling device is guaranteed by an extension of the pivot bolt 9 protruding from the face of the coupling device directed toward the center of the tubular section, which pivot bolt extension 10 is of enlarged diameter and is turned-off to form a portion 11 of reduced diameter and polygonal, preferably rectangular cross section. In the same plane transverse to the longitudinal axis of the tubular section, which plane extends through the aforesaid polygonal bolt portion 11, the central portion 1 of the tubular section is also provided with a turned-in groove of the same profile as the groove formed in bolt extension 10 by the recessed portion 11. Consequently, a preferably resilient connecting steel clamp 13, a front view of which is shown in FIGURE 5 can be inserted with its free ends into the groove at 12 in central portion 1 and with its U-shaped portion into the groove in bolt extension 10 in such a manner as to enclose the reduced bolt portion 11 on 3 sides and, since its thickness corresponds to the width of the grooves 11 and 12, to connect the coupling member via bolt extension 10, secure against axial displacement with the central portion 1 of the tubular section, while permitting swivelling of the coupling device away and toward the end piece of the tubular section enclosed thereby.

This also ensures maintenance of the above-mentioned short distance between the flanges of the double clamp and the rearward shoulders of beads 4 and 5, respectively.

Figure 2:
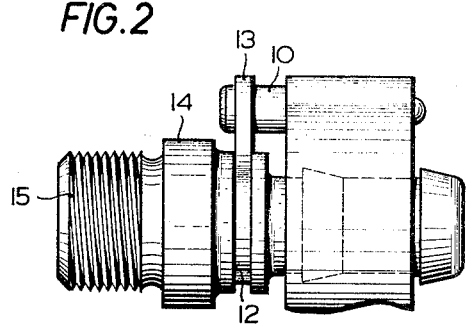
FIGURE 2 shows in lateral view another embodiment of a tubular section and one double clamp coupling device mounted thereon.

FIGURE 2 shows an embodiment of the arrangement according to the invention which forms an integral unit with a connecting socket 14 provided with an external threading 15. Like numerals in FIGURE 2 and in subsequent figures indicate like parts as in FIGURE 1.

The arrangement of FIGURE 2 can be screwed into a pipe line for compressed air, while a flexible compressed air hose can be drawn over the end portion in FIGURE 2 and can be fastened on the said end portion in the same manner as described in connection with FIGURE 1.

Figure 3:
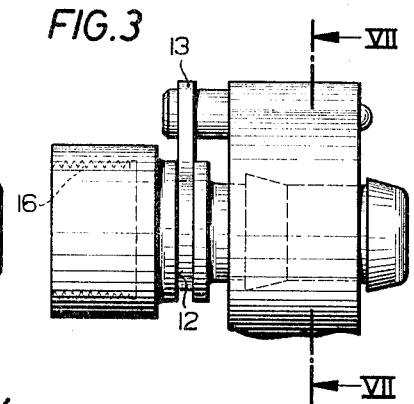
FIGURE 3 shows in side view yet another embodiment of the coupling assembly according to the invention similar to that shown in FIGURE 2.

FIGURE 3 shows yet another embodiment of the arrangement according to the invention similar to that in FIGURE 2 but bearing an internal threading 16.

Figure 4:
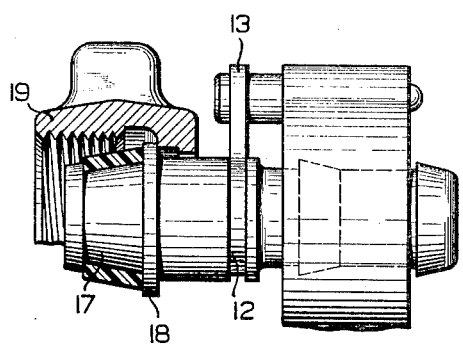
FIGURE 4 shows, in side view and partially sectional view, yet a further embodiment of another coupling assembly according to the invention.

A further embodiment of an arrangement according to the invention is shown in FIGURE 4, in which the connecting tubular section is provided at one end with a conically tapered end piece 17 with an abutment flange 18 and an end flange 18a and a packing or sealing ring 18b mounted on said conically tapered end piece 17. A nut 19 is mounted on the central portion 1 of the tubular section for abutment against flange 18 and is provided with internal threading 19a, whereby it can be screwed onto an internally threaded end of a pressure pipe (not shown).

In FIGURE 7, reference numeral 20 designates one sleeve half of a double clamp coupling device as shown in FIGURES 1 to 4, the flanges of which are provided at the end faces of the sleeve shell 21. The second sleeve half 22 of the double clamp coupling device is connected with the first sleeve half 20 articulatedly by means of pivot bolt 9 mentioned in FIGURE 1, the extension 10 of which serves for positioning the coupling device via the connecting clamp or key number 13, relative to the tubular section. The two end flanges of the sleeve halves, only one of which is visible in FIGURE 7 are mounted on opposite ends of the sleeve shell 23. Closing and locking of the double clamp coupling device is effected by means of toggle lever 24, 25 which is mounted on pivot pin 26 which is in turn located in sleeve half 22 at the free end thereof, approximately opposite pivot bolt 9. A leaf spring 28 is fastened with its one end on a pin 27 mounted on toggle lever 24, 25, while its other end is fastened to a pin 29 on the first sleeve half 20.

The above described assembly arrangement according to the invention can be varied in many ways. More in particular, the width of flanges 6 and 7 of the double clamp coupling device as well as their distance from the rearward shoulders of the beads 4, 5 can be adapted to the dimensions of the hoses to be connected, and more in particular to the diameter of such hoses and/or the thickness of the hose wall and the material of the hose.

Preferably, the width of the flanges 6, 7 ranges from approximately 2 millimeters for hoses of smaller diameter, e.g. of 20 to 45 mm. external diameters to about 3 mm. or higher for hoses having an outer diameter above 45 mm. Correspondingly, the gap between a clamping flange and the rearward shoulder of the beads 4, 5 with which it is to co-operate, ranges preferably from about 1 to 3 millimeters. The length of the hose portion to be clamped-in by the coupling device according to the invention depends also considerably on the strength of the locking spring 28.

In the embodiment shown in FIGURES 8 and 9, two pivot bolts in the double clamp coupling device, which bolts are located approximately diametrically opposite each other, on opposite sides of the hose to be connected, serve to position the two sleeve halves of the coupling device secure against axial displacement on a tubular section, whereby, in this embodiment, even the strongest axial forces transmitted by the hose of the coupling device exert only pull, but no bending or shearing forces on the aforesaid pivot bolt, so that there is no danger of any bending or loosening of any parts of the coupling arrangement according to the invention.

More in detail reference numerals 31 and 32 in FIGURES 8 and 9 designate the two sleeve halves of a hose coupling device which are connected with each other hingedly by means of pivot bolt 33. Both sleeve halves are preferably of U-shaped profile. Consequently, when these sleeve halves are pressed from steel sheet, they possess only relatively narrow, e.g. about 2 millimeter wide side walls 34 and 36, respectively, which press the hose at the places engaged by them, tightly upon the inserted tubular section when the coupling device is closed upon the hose and locked into position. In this embodiment, the tubular section 30 is also provided with beads 38, 39 the flanks of which facing toward the center of the tubular section, i.e. away from the next adjacent end thereof are abruptly sloped to form shoulders 40, 41, the distance between the slopes 40 and 41 being preferably approximately equal or somewhat shorter than the external width of the sleeve half of the coupling device. In order to absorb the tensile stresses exerted by the hose 42 mounted upon the tubular section when the pressure in the hose is high, an extension 52, of enlarged diameter, of pivot bolt 43 is provided at the free end portion of the second sleeve half 32. The aforesaid pivot bolt 43 serves at the same time for hingedly connecting the toggle lever 44.

Because of constructional reasons pivot bolt 43 is at a larger distance from the longitudinal axis 45 of the tubular section 30 than the above-described pivot bolt 33. In the same manner as has been described in FIGURE 2 for pivot bolts 9, 10 the pivot bolt 33 is secured against axial displacement relative to tubular section 30 by a clamping member 46 of spring steel which is inserted into groove 47 provided in the thickened extension 48 of pivot bolt 33 on the one hand and, with its free ends, into a groove 50 on the rearward portion 49 of the tubular section 30. In a similar manner the second pivot bolt 43 is secured against axial displacement relative to the tubular section 30 by means of a connecting member 51, e.g. a curved spring steel as shown in FIGURES 5 and 6, which connecting member is inserted, on the one hand in a groove 53 provided in the thickened extension 52 of pivot bolt 43, and with its free end, in a groove 54 of a rearward enlarged portion 49 of tubular section 30.

FIGURE 9 shows such a coupling assembly in opened condition. This assembly is closed with the aid of spring 55 which is fastened with its one end on a pin 56 mounted on toggle lever 44, the free end of which spring 55 is inserted, for instance by hand into a recess 57 of sleeve half 31, near the free end of the latter, whereupon movement of toggle lever 44 in the direction of arrow 58 urges the free end of the two sleeve halves 31 and 32 into contact with each other so that, in closed condition of the coupling device, the rims of side walls or flanges 34 and 36 of the sleeve halves are pressed into the material of the hose 42, gripping the hose in the immediate vicinity of the shoulders 40, 41 of beads 38, 39. In this position, the two pivot bolts 33 and 43 are located approximately in the same geometrical plane passing through the longitudinal axis of one of these bolts and through that of tubular section 30, the longitudinal axis of the other bolt being also in or close to this plane. Thereby the stresses exerted by the hose upon the coupling assembly act substantially evenly and essentially in axial direction only upon the two pivot bolts. No bending moments worth mentioning can occur so that a deformation of any parts of the coupling assembly is avoided even as hose pressures are mounting to several hundred atmospheres.

I claim:
1. A coupling assembly for hoses, comprising,
a tubular section having a central portion of increased diameter and at least one tapered end portion adapted for insertion into the end of a flexible hose, said central portion having at least one circumferential groove provided therein,
at least one coupling device associated with one zone of said tubular section intermediate said central portion and said tapered end portion,
said coupling device comprising two sleeve halves each having two flanged end portions and pivotally connected with each other by means of a first pivot bolt, said sleeve halves when in closed position, surrounding said zone of said tubular section,
a toggle lever, pivotally connected to a first one of said sleeve halves by means of a second pivot bolt,
spring means connecting said toggle lever with the second one of said sleeve halves and adapted to urge said two sleeve halves into closed position upon swivelling said toggle lever into contact with the first sleeve half,
whereby said flange portions of said sleeve halves press a hose into which said free end of said tubular section has been inserted, against the outer wall of said tubular section,
positioning bolt means mounted on said coupling device on the side thereof facing away from the said tapered end portion of said tubular section and extending substantially parallel to the longitudinal axis of said tubular section,
said positioning bolt means having at least one circumferential groove provided therein of a cross sectional area substantially equal to that of said groove of said central tubular section portion, and
connecting means having a cross section adapted to be inserted into said grooves, said connecting means being removably inserted with its one end into a groove of said positioning bolt means and with its other end into said groove of the central portion of said tubular means, thereby securing said coupling device and said tubular section against displacement relative to each other in the direction of the longitudinal axis of said tubular section, while permitting radial displacement of said sleeve halves of said coupling device relative to said tubular section, said connecting means comprising a hoop-shaped fork member of spring steel, rectangular in cross section, the closed curved top end of which is of a curvature adapted to the diameter of said positioning bolt means in said circumferential groove therein, and the legs of said hook-shaped fork member being spaced from each other near the ends thereof by a distance corresponding to the diameter of said central portion of said tubular section in said circumferential groove thereof.

2. A coupling assembly for hoses, comprising;
(a) two sleeves halves having each two flanged end portions and being pivotally connected with each other by means of a first pivot bolt, and
(b) a tubular section surrounded by said sleeve halves when in closed position, the central portion of which section has first and second circumferential groove means, at least one free end of said tubular section being adapted for insertion into a flexible hose,
    (1) a toggle lever pivotally connected to a first one of said sleeve halves by means of a second pivot bolt, located approximately diametrically opposite said first pivot bolt relative to the central axis of said coupling device, (2) spring means connecting said toggle lever with the second one of said sleeve halves and adapted to urge said two sleeve halves into closed position upon swivelling said toggle lever into contact with the first sleeve half, whereby said flange portions of said sleeve halves press a hose into which said free end of said tubular section has been inserted, against the outer wall of said tubular section, and (3) means for positioning said flanged portions relative to said tubular section, said means comprising (i) first positioning bolt means mounted on said coupling device on the side thereof facing away from the next-adjacent end of said tubular section and being aligned with said first pivot bolt, (ii) second positioning bolt means mounted on said coupling device on the same side of said first positioning bolt means and being aligned with said second pivot bolt, both said positioning bolt means extending substantially parallel to the longitudinal axis of said tubular section and having circumferential groove means of substantially equal cross sectional area as that of said groove means of said tubular section, first and second connecting means having a cross sectional area fitting, on the one hand, into said first and second groove means of said tubular section, respectively, and, on the other hand, into the groove means of said first and second positioning bolt means, said first connecting means being inserted with its one end into said groove means of said first positioning bolt means and with its other end into the first groove means of said tubular section, and said second connecting means being inserted with its one end into said groove means of said second positioning bolt means and with its other end into the second groove means of said tubular section, thereby securing said coupling device and said tubular section against displacement relative to each other in the direction of the longitudinal axis of said tubular section, while permitting radial displacement of said sleeve halves of said coupling device relative to said tubular section.

3. A coupling assembly as described in claim 2, wherein each said connecting means comprises a hoop-shaped member made of spring steel.

4. A coupling assembly as described in claim 2, wherein said first pivot bolt protrudes from said coupling device on the side thereof facing away from the nearest end of said tubular section, to form said first positioning bolt means.

5. A coupling assembly as described in claim 2, wherein said second pivot bolt protrudes from said coupling device on the side thereof facing away from the nearest end of said tubular section, to form said second positioning bolt means.

6. A coupling assembly as described in claim 2, wherein at least one of said first and second connecting means is rotatably supported in the respective groove of said tubular section, whereby a certain rotational play of said first pivot bolt and said second pivot bolt relative to each other about the longitudinal axis of said tubular section is ensured.

7. A coupling assembly for hoses, comprising two sleeve halves having each two flanged end portions, a first pivot bolt pivotally interconnecting said sleeve halves, a tubular section surrounded by said sleeve halves when in closed position, at least one free end of said tubular section being adapted for insertion into a flexible hose, a toggle lever, a second pivot bolt pivotally connecting said toggle lever to a first one of said sleeve halves, said pivot bolts being substantially diametrically opposite each other when the coupling is closed, spring means connecting said toggle lever with the second one of said sleeve halves and adapted to urge said two sleeve halves into closed position about said tubular section upon swivelling said toggle lever into contact with said first one of said sleeve halves whereby said flange portions of said sleeve halves press a hose into which said free end of said tubular section has been inserted into sealing engagement with the outer wall of said tubular section, and positioning means for positioning said flanged portions relative to said tubular section, said positioning means comprising positioning bolt means mounted on said coupling device on the side thereof facing away from said one free end of said tubular section and extending substantially parallel to the axis of said tubular section, and connecting means extending from said positioning bolt means to said tubular section in a direction transverse to the axis of said tubular section, said connecting means being connected to said positioning bolt means and said tubular section so as to be held thereon against axial movement on either thereof and also so as to support said positioning bolt means and said tubular section assembled in laterally spaced parallel relation, said connecting means comprising a double armed fork member formed of a spring member which is polygonal in cross section, and grooves having a cross section corresponding to that of said spring member formed in the circumference of said positioning bolt means and in the circumference of said tubular section, said fork member being fitted into both said grooves and being readily removable therefrom, said fork member having a smaller closed end engaging the groove in said positioning bolt means and a larger open end engaging the groove in said tubular section, the legs of said fork member where they engage the groove in said tubular section being concave toward each other so as to hold the fork member against radial movement on said tubular section.

8. A coupling assembly as described in claim 7, wherein said spring member is spring steel.

9. A coupling assembly as described in claim 7, wherein said spring member and said grooves are rectangular in cross section.

References Cited by the Examiner

UNITED STATES PATENTS

| 874,378 | 12/1907 | Allen | 285—114 |
| 1,110,011 | 9/1914 | Schneider | 285—114 |
| 1,505,255 | 8/1924 | Gold | 285—253 X |
| 2,095,932 | 10/1937 | Kucera | 285—321 X |

FOREIGN PATENTS 917,993 2/1963 Great Britain.

CARL W. TOMLIN, *Primary Examiner.*

THOMAS F. CALLAGHAN, *Examiner.*